(12) United States Patent
Kezys et al.

(10) Patent No.: US 8,817,725 B2
(45) Date of Patent: Aug. 26, 2014

(54) SCHEDULING TRANSMISSION OF TRAFFIC TREATED LESS PREFERENTIALLY DESPITE TIMING REQUIREMENTS

(75) Inventors: Vytautas Robertas Kezys, Ancaster (CA); Michael Peter Montemurro, Toronto (CA); Mohammed Nawaf Smadi, Ancaster (CA)

(73) Assignee: BlackBerry Limited, Waterloo, Ontario (CA)

( * ) Notice: Subject to any disclaimer, the term of this patent is extended or adjusted under 35 U.S.C. 154(b) by 393 days.

(21) Appl. No.: 13/349,716

(22) Filed: Jan. 13, 2012

(65) Prior Publication Data

US 2013/0182650 A1  Jul. 18, 2013

(51) Int. Cl.
| | |
|---|---|
| *H04L 12/28* | (2006.01) |
| *H04W 4/00* | (2009.01) |
| *H04J 3/16* | (2006.01) |
| *H04W 52/02* | (2009.01) |
| *H04L 29/08* | (2006.01) |
| *H04W 72/04* | (2009.01) |

(52) U.S. Cl.
CPC .............. *H04W 52/028* (2013.01); *H04L 69/32* (2013.01); *H04W 72/04* (2013.01)
USPC ........... 370/329; 370/328; 370/338; 370/469; 370/503; 455/552.1; 455/574; 375/220

(58) Field of Classification Search
CPC . H04W 8/005; H04W 88/06; H04W 72/1215; H04W 28/10; H04L 29/06027; H04L 65/80; H04L 65/608; H04L 65/4084
USPC ................................................... 370/228–356
See application file for complete search history.

(56) References Cited

U.S. PATENT DOCUMENTS

| | | | | |
|---|---|---|---|---|
| 5,905,845 | A * | 5/1999 | Okada et al. ................... | 386/244 |
| 6,173,113 | B1 * | 1/2001 | Okada et al. ................... | 386/240 |
| 6,341,199 | B1 * | 1/2002 | Okada et al. ................... | 386/328 |
| 6,549,722 | B2 * | 4/2003 | Okada et al. ................... | 386/245 |
| 7,054,546 | B2 * | 5/2006 | Murakami et al. ............. | 386/248 |
| 7,274,860 | B2 * | 9/2007 | Okada et al. ................... | 386/248 |
| 7,447,422 | B2 * | 11/2008 | Okuyama ...................... | 386/329 |
| 7,672,414 | B2 * | 3/2010 | Page .............................. | 375/355 |
| 7,675,943 | B2 * | 3/2010 | Mosig ............................ | 370/503 |
| 7,787,500 | B2 * | 8/2010 | Tsuchinaga et al. ........... | 370/516 |

(Continued)

OTHER PUBLICATIONS

Chimet, Dan, Extended European Search Report for EP 12151133.1, Jun. 21, 2012.

(Continued)

*Primary Examiner* — Venkatesh Haliyur
(74) *Attorney, Agent, or Firm* — Integral Intellectual Property Inc.; Miriam Paton

(57) ABSTRACT

A source device has a wireless communication interface. Through the wireless communication interface, the source device establishes a communication session over a wireless medium with a sink device and determines a maximum capacity of a buffer at the sink device for receipt of audio samples to be transmitted in packets from the source device to the sink device in an asynchronous connectionless link over the wireless medium. Scheduling access to the wireless medium by the wireless communication interface for transmission of audio samples on the link takes into account the maximum capacity of the buffer.

19 Claims, 10 Drawing Sheets

(56) References Cited

U.S. PATENT DOCUMENTS

| | | | |
|---|---|---|---|
| 7,801,099 B2* | 9/2010 | Desai | 370/338 |
| 7,817,650 B2* | 10/2010 | Page | 370/411 |
| 7,826,411 B2* | 11/2010 | Gonikberg et al. | 370/328 |
| 7,881,746 B2* | 2/2011 | Desai | 455/552.1 |
| 7,945,206 B2* | 5/2011 | Wilhelmsson et al. | 455/12.1 |
| 7,961,756 B1* | 6/2011 | Lambert et al. | 370/469 |
| 8,086,087 B2* | 12/2011 | Kato | 386/201 |
| 8,086,264 B2* | 12/2011 | Desai | 455/552.1 |
| 8,089,922 B2* | 1/2012 | Gonikberg et al. | 370/328 |
| 8,208,351 B2* | 6/2012 | Ma | 369/30.23 |
| 8,238,292 B2* | 8/2012 | Gonikberg et al. | 370/328 |
| 8,249,433 B2* | 8/2012 | Tanaka | 386/344 |
| 8,265,017 B2* | 9/2012 | Robinson et al. | 370/329 |
| 8,428,002 B2* | 4/2013 | Gonikberg et al. | 370/328 |
| 2004/0228367 A1 | 11/2004 | Mosig | |
| 2007/0070961 A1 | 3/2007 | Tao | |
| 2008/0259846 A1* | 10/2008 | Gonikberg et al. | 370/328 |
| 2008/0279138 A1* | 11/2008 | Gonikberg et al. | 370/328 |
| 2008/0279162 A1* | 11/2008 | Desai | 370/338 |
| 2008/0279163 A1* | 11/2008 | Desai | 370/338 |
| 2008/0279264 A1* | 11/2008 | Desai et al. | 375/220 |
| 2009/0257379 A1* | 10/2009 | Robinson et al. | 370/328 |
| 2010/0322222 A1* | 12/2010 | Desai | 370/338 |
| 2011/0002291 A1* | 1/2011 | Gonikberg et al. | 370/329 |
| 2012/0106419 A1* | 5/2012 | Gonikberg et al. | 370/311 |

OTHER PUBLICATIONS

Shi, Minghui, First Office Action for CA 2,795,371, Oct. 23, 2013.
Wang, Yu-Chin et al., "Seamless Handover with Buffer Prediction for Wireless Networks Based on IEEE 802.21", Wang et al., "Seamless Handover with Buffer Prediction for Wireless Networks Based on IEEE 802.21", ICOIN 2008. International Conference on Information Networking, 2008. pp. 1-5, Jan. 25, 2008.
Chimet, Dan, Extended European Search Report for EP 12189598.1, Feb. 4, 2013.
"Wireless Networks and Mobile Systems, Lecture 6, 802.11b, Bluetooth and Coexistence", retrieved online May 25, 2009.
Bar-Shalom, Ofer, "On the Union of WPAN and WLAN in Mobile Computers and Hand-Held Devices", Aug. 2003.
Broadcom Corporation, "White Paper BCM4325 Bluetooth and WLAN Coexistence", Aug. 2008.
Chokshi, Ronak, "White Paper: Yes! Wi-Fi and Bluetooth Can Coexist in Handheld Devices", Marvell, Mar. 2010.
Golmie, N. et al., "Bluetooth and WLAN Coexistence: Challenges and Solutions", Dec. 2003.
Philips Semiconductors, "How 802.11b/g WLAN and Bluetooth Can Play", Sep. 2005.
Quinnell, Richard A., "WiFi and Bluetooth fight for bandwidth", Electronics Design, Strategy, News (EDN), Aug. 4, 2005, pp. 73-78.
Tao, Xiao-Jiao, "Bluetooth-WiFi Coexistence in Mobile Handset", Huawei Technologies Co., Ltd. Apr. 2009.

* cited by examiner

SCHEDULING TRANSMISSION OF TRAFFIC TREATED LESS PREFERENTIALLY DESPITE TIMING REQUIREMENTS

TECHNICAL FIELD

The technology described herein relates generally to a device in which two or more collocated communication functional modules share access to a single wireless medium. For example, the device may have collocated wireless local area network (WLAN) and Bluetooth® functional modules. In another example, the device may be a Peer-to-Peer (P2P) Concurrent Device that can operate concurrently as a P2P device and with a WLAN infrastructure network.

BACKGROUND

Bluetooth® (BT) carries two types of traffic: high priority traffic, for example, voice traffic, and low priority traffic. Low priority traffic is carried over Asynchronous Connectionless (ACL) links with retransmission capability.

Consider a device that has a BT functional module and a wireless local area network (WLAN) functional module. These two functional modules share access to a single wireless medium, because they both operate in the ISM 2.4 GHz band. To reduce the incidence of collisions, an arbitration mechanism, usually implemented as part of the WLAN functional module, determines which of the two functional modules is offered access to the shared wireless medium. Some arbitration mechanisms rely on packet counters and timeout intervals, offering access to one of the functional modules until it either completes a pre-specified number of packet exchanges or until a timer expires, before offering access to the other of the functional modules. Thus the BT functional module has reduced access to the wireless medium, due to sharing with the WLAN functional module. However, when the WLAN functional module is active, typically this is the result of being in an active WLAN network, which is more likely to result in additional interference to the BT functional module, thus increasing the need for more retransmissions of low priority BT traffic.

SUMMARY

First traffic and second traffic are to be carried on the same wireless medium, for example, the unlicensed industrial, scientific and medical (ISM) 2.4 GHz band. The first traffic is transmitted from a source device to a sink device, where it is buffered temporarily. The first traffic, despite having timing requirements, is treated less preferentially by the source device than the second traffic. The source device may preempt or may interrupt and supplant scheduled transmissions of the first traffic due to the second traffic. This may result in failure to meet the timing requirements of the first traffic. For example, if the first traffic involves the transmission of high-quality audio content in mono or stereo from the source device to the sink device, audio stream outages may occur at the sink device.

To address this issue, the source device determines the size of the buffer at the sink device that is to receive the first traffic or samples derived therefrom. The source device is able to determine, for example, by calculation or estimation, how long until the buffer will be depleted (defined as the buffer is empty or has reached a predetermined low level). A scheduler in the source device schedules transmissions of the first traffic opportunistically around the second traffic in an attempt to avoid or reduce depletion of the buffer.

In one example, the source device includes collocated wireless local area network (WLAN) and Bluetooth® (BT) functional modules, the first traffic is A2DP traffic carried on the wireless medium over a BT asynchronous connectionless (ACL) channel, and the second traffic is WLAN traffic.

In another example, the source device includes a BT functional module, the first traffic is A2DP traffic carried on the wireless medium over a BT ACL channel, and the second traffic is high priority BT traffic, for example, voice BT traffic, that is carried on the wireless medium over a BT synchronous connection oriented (SCO) channel.

In yet another example, the source device is a Peer-to-Peer (P2P) Concurrent Device that can operate concurrently as a P2P device and with a WLAN infrastructure network, the first traffic is P2P traffic and the second traffic is traffic in the WLAN infrastructure network. In this example, the source device and the sink device are P2P devices as described in the Wi-Fi® Peer-to-Peer (P2P) Technical Specification, Version 1.1 (published 2010) or its official successors.

BRIEF DESCRIPTION OF THE DRAWINGS

The figures of the accompanying drawings are intended to illustrate by way of example and not limitation. Like reference numbers in the figures indicate corresponding, analogous or similar elements.

FIGS. 5-1, 5-2 and 5-3 are example timelines helpful in understanding the example method illustrated in FIG. 4;

FIGS. 7-1, 7-2 and 7-3 are example timelines helpful in understanding the example method illustrated in FIG. 6;

DETAILED DESCRIPTION

Figure 1:
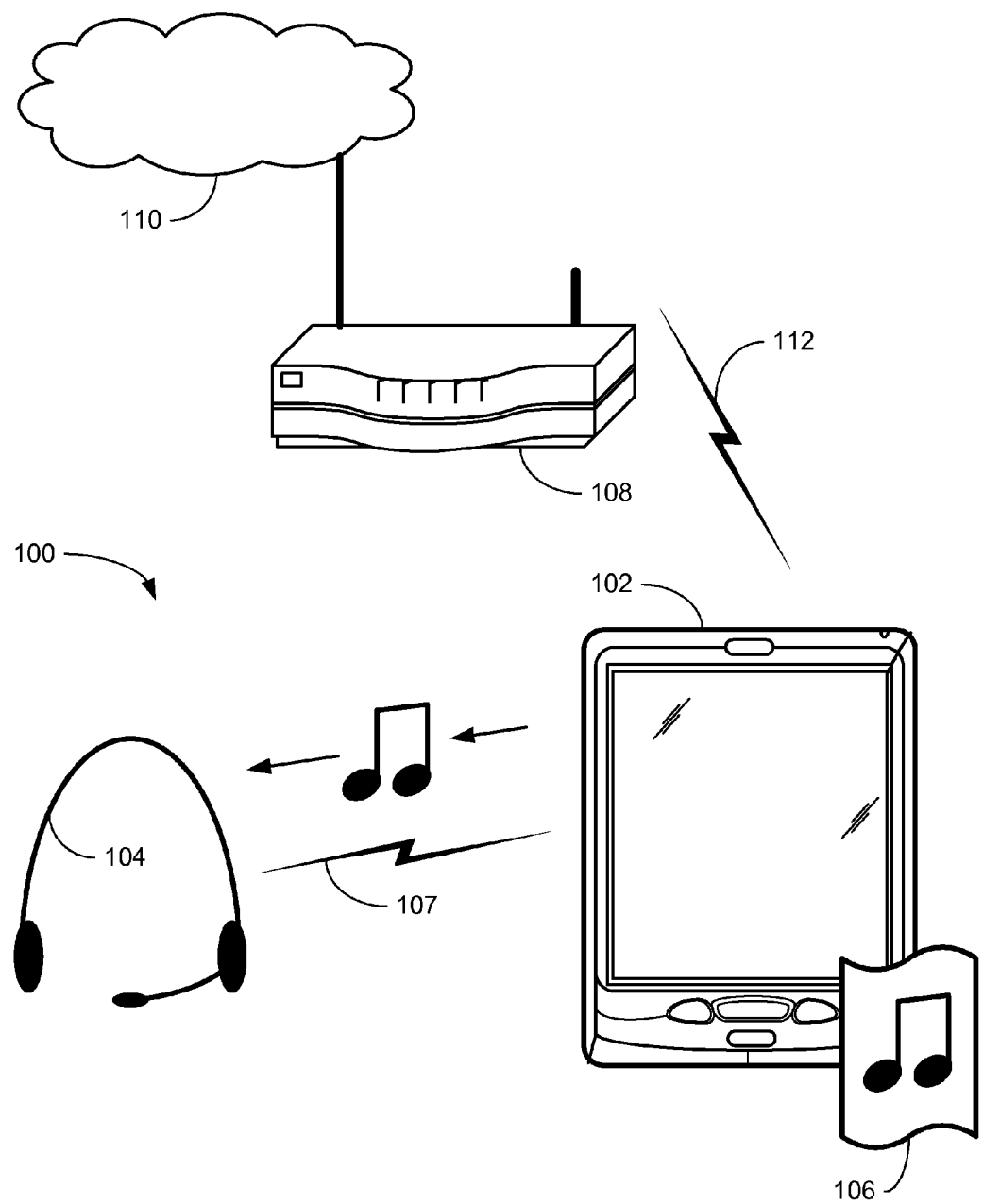
FIG. 1 illustrates an example system for audio streaming.

The distribution of high-quality audio content in mono or stereo on Asynchronous Connectionless (ACL) channels using Bluetooth® (BT) technology is defined in the BT Advanced Audio Distribution Profile (A2DP) Specification Version 12 (published 16 Apr. 2007). Unlike other low priority traffic, A2DP traffic has some timing requirements, which albeit less strict than the timing requirements of high priority traffic, involve a certain guaranteed end-to-end flow rate to prevent audio stream outages. When two BT devices establish and engage in an A2DP stream, one of the BT devices acting as the source of the A2DP stream and the other of the BT devices acting as the sink of the A2DP stream, they are effectively relying on the best-effort recovery service offered by the underlying ACL. This approach may be suitable in situations where the medium is relatively free of interference and the ACL has ample time to perform these retransmissions.

When the wireless medium is shared by a collocated wireless local area network (WLAN) functional module, instantaneous BT retransmissions may be prematurely terminated to allow the collocated WLAN its access to the wireless medium. This reduces the collocated BT functional module's ability to send retransmissions. Moreover, some of the time allocated to the WLAN functional module to access the shared wireless medium may be wasted when the WLAN functional module has nothing to transmit, while during that time the BT functional module could have been sending transmissions or retransmissions. In addition, when the functional module is active, typically this is the result of being in an active WLAN network, which is more likely to result in additional interference to the BT functional module, thus increasing the need for more retransmissions of low priority BT traffic.

Increased probability of retransmissions (due to higher environmental interference) and reduced access to the wireless medium (due to sharing it with a collocated WLAN functional module) results in a higher probability that the BT device engaged in the A2DP stream will have its audio buffer starved prior to receiving the stream data in time for playout without audio outages.

As described in further detail in this document, the BT device that is the source of the A2DP traffic ("source device") determines the size of the audio buffer in the BT device that is the sink of the A2DP traffic ("sink device"), even though the A2DP Specification V12 does not include any provisions for the source device to determine the size of the audio buffer in the sink device. The source device also knows the playout rate from the audio buffer in the BT device, from knowing the A2DP encoder used. Thus a scheduler in the source device can estimate the length of the buffered playout period at the sink device, thus enabling the scheduler to schedule BT A2DP transmissions just-in-time before the audio buffer in the sink device is depleted.

Knowing the buffering state at the sink device allows the scheduler to schedule BT A2DP transmissions opportunistically around WLAN traffic (or high priority BT traffic). The amount of time that the scheduler will awaken the streaming BT interface to resume transmitting should account for:

Channel conditions, that is, time needed for retransmissions. In any interference-prone environment, the probability of BT retransmissions increases. Channel estimators such as packet error rate may be used to estimate the time required to successfully deliver the required number of A2DP packets—while accounting for retransmissions—with a certain design probability.

Certain periodic downlink WLAN management frames, for example, WLAN beacon frames, which are required for correct and timely continued WLAN operation. The scheduler may offer access to the shared medium to the BT functional module earlier than otherwise scheduled in order to avoid the BT functional module being scheduled to transmit during expected periods of arrival of period downlink WLAN management frames. This behavior of the scheduler may yield some inefficiency from a power consumption point of view.

In cases where the collocated WLAN functional module can tolerate a certain number of missed WLAN management frames of a certain type, for example missed WLAN beacon frames, then the scheduler can intentionally decide to have the collocated WLAN functional module miss the reception of these frames in lieu of better power performance at the collocated BT functional module.

FIG. 1 illustrates an example system 100 for audio streaming. System 100 comprises devices 102 and 104. Device 102 is to stream audio to device 104 over a wireless medium. In other words, audio samples from an audio file 106 at or accessible by device 102 are delivered to device 104, and audio samples received by device 104 may be played back at device 104 before all audio samples of audio file 106 have been delivered to device 104. It is also possible that audio file 106 is delivered to device 102 from an external source (not shown) and that transmission of audio samples from device 102 to device 104 may occur before all audio samples of audio file 106 have been delivered to device 102. This latter situation may occur, for example, where audio in audio file 106 is from a live performance being streamed over the Internet or where audio in audio file 106 is from an AM/FM/satellite radio station transmission.

With respect to the streaming of audio from device 102 to device 104, device 102 is the source of the streamed audio and is henceforth referred to as "source device 102", and device 104 is the sink or destination of the streamed audio and is henceforth referred to as "sink device 104". As used herein, the term "audio sample" refers to "digital audio sample".

A non-exhaustive list of examples for source device 102 includes a dedicated audio transmitter, for example, a dongle or adapter, a music handset, a mobile phone, a smartphone, a laptop computer, a desktop computer, a notebook computer, a tablet computer, a slate computer, a pocket computer, a television, a media server or set-top box.

A non-exhaustive list of examples for sink device 104 includes a dedicated audio receiver, for example, an adapter, a speaker, a headset, a pair of sunglasses, a jacket or other wearable garment, a hearing aid, a car radio, a media client running on a computing device.

Source device 102 and sink device 104 are operative in a radio frequency band, for example, in the unlicensed industrial, scientific and medical (ISM) 2.4 GHz band, in accordance with a first wireless communication technology. For example, the first wireless communication technology comprises an adaptive frequency-hopping (AFH) spread spectrum wireless personal area network (WPAN) technology. The BLUETOOTH (BT) family of specifications is an example of specifications for a frequency-hopping spread-spectrum WPAN technology. An example frequency-hopping spread-spectrum technique is described in the BT Specification Version 4.0 [Vol. 2], Architecture, Baseband Specification, especially section 2.6 pages 83-95, (published 30 Jun. 2010). An example AFH spread-spectrum technique is described in section 4.1.4 of the BT Specification Version 4.0 [Vol. 2], Link Manager Protocol Specification, pages 234-236, (published 30 Jun. 2010), and was originally introduced in the BT Specification Version 1.2.

Source device 102 streams audio to sink device 104 by transmitting packets over the wireless medium in a packet-switched connection 107 that provides a best-effort recovery mechanism. An example packet-switched connection is an asynchronous connection-less (ACL) channel, described in section 3.5.4.1 of the BT specification Version 4.0. Packets sent over an ACL channel which are not acknowledged by the recipient are retransmitted by the sender, as part of the best-effort recovery mechanism.

Specifically with respect to the streaming of audio, source device 102 and sink device 104 may be compatible with the BT Advanced Audio Distribution Profile (A2DP) Specification Version 12 (published 16 Apr. 2007) or its official successors.

The A2DP Specification defines the protocols and procedures that allow distribution of high-quality audio content in mono or stereo on ACL channels. The audio data is compressed for efficient use of BT technology bandwidth.

Source device 102 may optionally be operative in the radio frequency band, for example, in the ISM 2.4 GHz band, in accordance with a second wireless communication technology. For example, the second wireless communication technology comprises a wireless local area network (WLAN) technology, such as, for example, Institute of Electrical and Electronics Engineers (IEEE) Standard 802.11 (IEEE 802.11) technology.

System 100 may optionally comprise an access point 108 operative in the radio frequency band, for example, in the ISM 2.4 GHz band, in accordance with the second wireless communication technology. Source device 102 may be able to access a network 110, for example, the Internet, via a WLAN connection 112 with access point 108.

Figure 2:
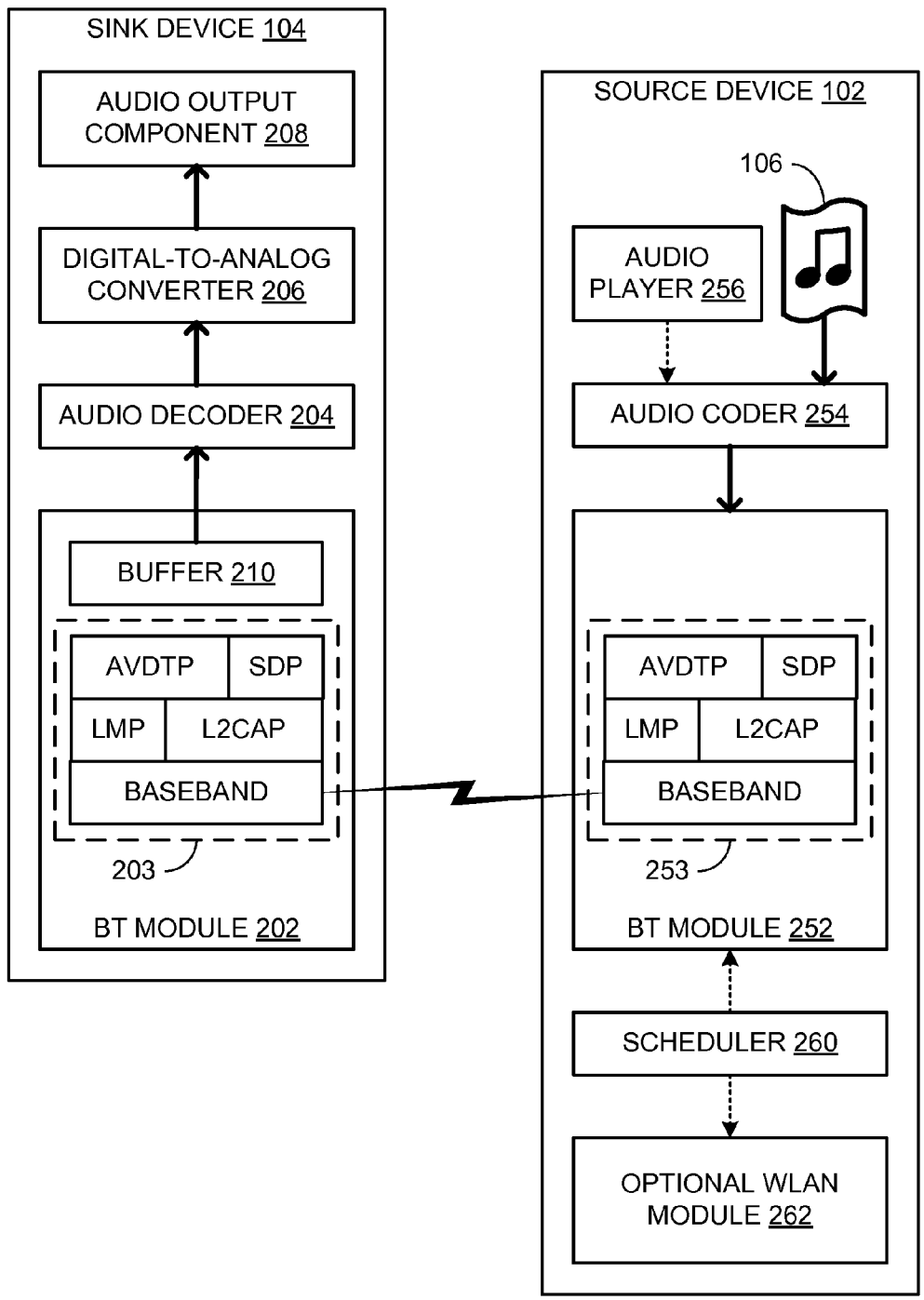
FIG. 2 illustrates example functional aspects of an example source device and an example sink device, helpful in understanding the technology described herein.

FIG. 2 illustrates example functional aspects of source device 102 and sink device 104, helpful in understanding the technology described herein.

In the example illustrated in FIG. 2, sink device 104 comprises a BT module 202, an audio decoder 204, a digital-to-analog converter (DAC) 206, and an audio output component 208, for example, a speaker. BT module 202 is compatible with the BT A2DP Specification Version 12 or its official successors, and implements a BT protocol stack, a portion of which is illustrated in FIG. 2 as BT stack 203. A buffer 210 in BT module 202 receives audio samples from source device 102 and interacts with BT stack 203. The audio samples are decoded by audio decoder 204, converted to analog audio samples by DAC 206, and provided to audio output component 208.

In the example illustrated in FIG. 2, source device 102 comprises a BT module 252 and an audio coder 254. BT module 252 is compatible with the BT A2DP Specification Version 12 or its official successors, and implements a BT protocol stack, a portion of which is illustrated in FIG. 2 as BT stack 253. Audio file 106, which may be incomplete, is stored in memory of source device 102. An audio player 256 is installed in source device 102. Under control of audio player 256, audio coder 254 samples audio file 106, encodes the audio samples, and provides the output to BT module 252 for transmission to sink device 104.

BT stack 203 and BT stack 253 both include implementations of the following protocols: Logical link control and adaptation protocol (L2CAP), Link Management Protocol (LMP), Service discovery protocol (SDP), and Audio/Video data transport protocol (AVDTP).

Audio decoder 204 and audio coder 254 operate at the same sample rate and the same bit rate. Therefore source device 102 can determine the rate ("playback rate") at which sink device 104 plays back audio samples from buffer 210.

As described in further detail below, source device 102 determines the size of buffer 210, even though the A2DP Specification V12 does not include any provisions for source device 102 to determine the size of buffer 210.

As described in further detail below, source device 102 may monitor a number of audio samples transmitted to sink device 104 or alternatively may monitor a transmission rate of audio samples from source device 102 to sink device 104. Source device 102 is able to determine at any given time the number of audio samples remaining in buffer 210 by performing a calculation based on the size of buffer 210, the number of audio samples transmitted (discounting any retransmissions), and the playback rate.

A scheduler 260 comprised in source device 102 determines when BT module 252 should send further audio samples to sink device 104, the determination being based on the size of buffer 210, the number of audio samples transmitted or the transmission rate, the playback rate, and any other relevant input. In the case of the example method described with respect to FIG. 3, the determination is based on the size of buffer 210, the playback rate, the transmission rate, and a measure of the conditions on the ACL channel over which the A2DP packets comprising the audio samples are transmitted. In the case of the example method described with respect to FIG. 4, the determination is based on the number of audio samples in the buffer at the current time, the estimated size of the buffer (in number of samples), the playback rate, and the transmission rate. In the case of the example method described with respect to FIG. 6, the determination is based solely on the playback rate and the transmission rate.

Transmission rates may be averaged over a statistically representative period. As noted below, an acknowledgement received at source device 102 from sink device 104 may include a Flow field able to take on the values GO or STOP. A sample period could be chosen to be 250 msec or until the first acknowledgement having the value STOP arrives, whichever comes first. Alternatively, information at a different layer, including the L2CAP where the A2DP packets are sent, may be used to determine the total transmitted data.

Figure 3:
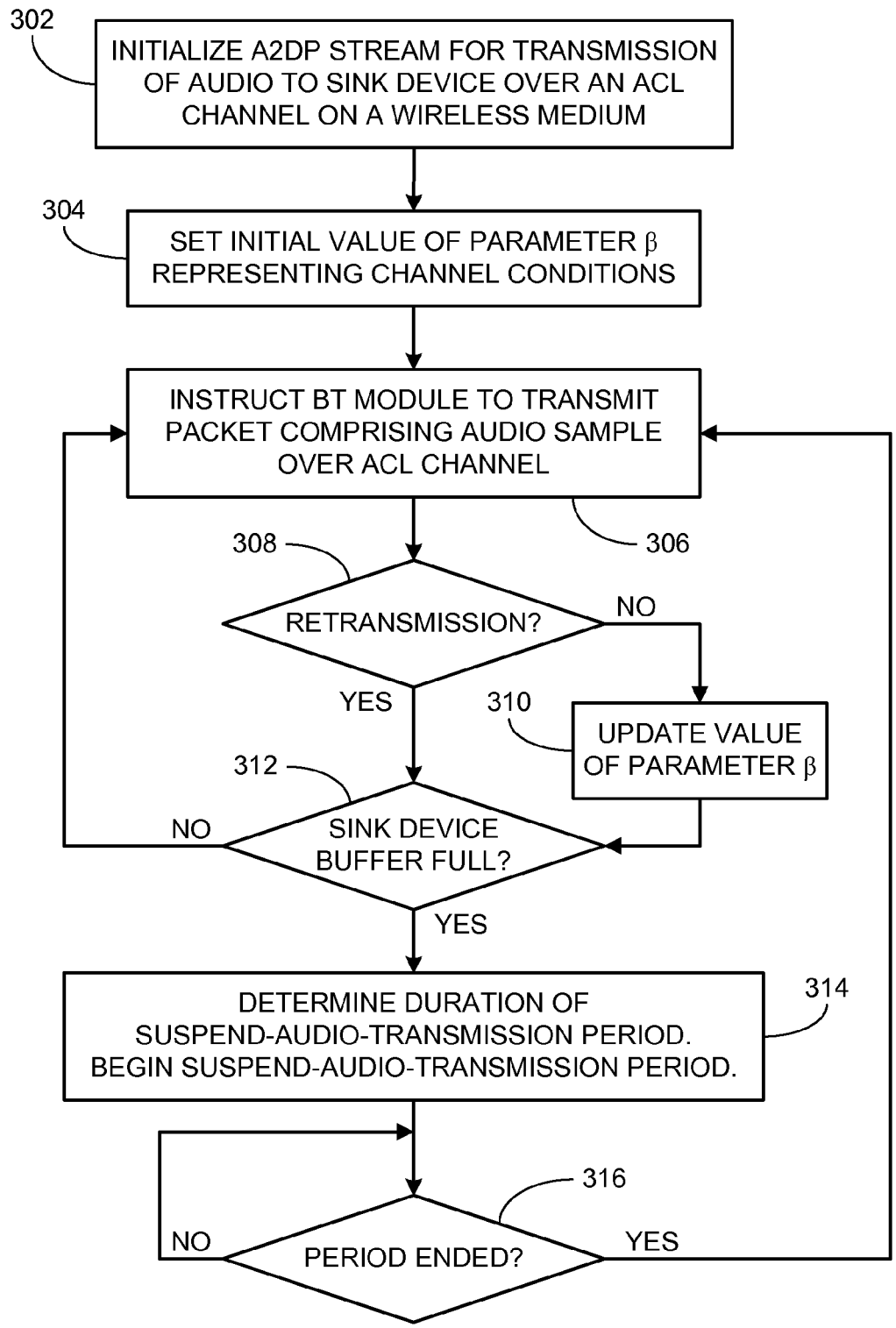
FIG. 3 illustrates an example method for determining when the source device should transmit audio samples to the sink device.

Consider, for example, the case where source device 102 does not comprise another module operative in the same radio frequency band as BT module 252. Scheduler 260 may be implemented in BT module 252 and therefore have access to the precise number of audio samples transmitted. FIG. 3 illustrates an example method to be implemented primarily by scheduler 260 to determine when BT module 252 should transmit audio samples to sink device 104. The example method illustrated in FIG. 3 is based on an assumption that transmission of audio samples from source device 102 to sink device 104 is not interrupted by high priority BT traffic between source device 102 and any other BT device (including sink device 104). High priority BT traffic, for example, voice BT traffic, is carried over synchronous connection oriented (SCO) channels, whereas A2DP traffic and low priority BT traffic is carried over ACL channels. A2DP traffic is considered to be of less priority than BT traffic carried over SCO channels. A2DP traffic is considered to be of higher priority than other traffic, e.g. data BT traffic, carried over ACL channels.

At 302, source device 102 initializes an A2DP stream for transmission of audio to sink device 104 over an ACL channel on a wireless medium. The initialization of the A2DP stream may be performed, for example, by the implementation of the AVDTP portion of BT stack 253. At 304, scheduler 260 sets an initial value of an indicator that represents conditions of the ACL channel over which the audio samples are being transmitted. For example, a channel quality indicator $\beta$ may be set to the value 1. At 306, scheduler 260 instructs BT module 252 to transmit a packet comprising an audio sample over the ACL channel. Initially, this packet comprises the first audio sample of the audio file being streamed.

At 308, scheduler 260 checks whether the transmission for which the instruction was given at 306 is a retransmission. Retransmission of a packet will occur if a most recent transmission of the packet was unacknowledged by the intended recipient. An indication whether the transmission is a retransmission or not will be available to scheduler 260 from the best-effort recovery mechanism, for example, from an ACL component of BT module 252. If the transmission for which the instruction was given at 306 is a retransmission, then at 310, scheduler 260 updates the value of the channel quality indicator that represents the channel conditions. For example, channel quality indicator β may be incremented by 1. The worse the channel conditions, the more numerous the occurrences of retransmissions.

If the transmission for which the instruction was given at 306 is not a retransmission, or after the value of the channel quality indicator has been updated, scheduler 260 will check at 312 whether buffer 210 at sink device 104 is full. As an alternative, scheduler 260 will check at 312 whether buffer 210 at sink device 104 has reached a particular capacity, for example, a "high watermark", where buffer 210 is almost full. Thus in this document, the phrases "the buffer is full" and "full buffer" are expanded to mean that the buffer has reached its maximum capacity or alternatively has reached a particular capacity, and the phrase "the buffer is not full" is expanded to mean that the buffer has not reached its maximum capacity or alternatively has not reached the particular capacity. An acknowledgement received at source device 102 from sink device 104 may include a Flow field able to take on the values GO or STOP. As long as buffer 210 is not full, the Flow field of the acknowledgement will have the value GO. When buffer 210 is full, the Flow field of the acknowledgement will have the value STOP. Scheduler 260 will be able to check whether buffer 210 at sink device 104 is full by inspecting the Flow field of the most recently received acknowledgement from sink device 104.

If buffer 210 is not full, then scheduler 260 instructs BT module 252 at 306 to transmit a packet comprising an audio sample over the ACL channel. If the transmission is not a retransmission, then the audio sample comprised in the packet is a next audio sample of the audio file.

If buffer 210 is full, then at 314, scheduler 260 determines a duration of a suspend-audio-transmission period, and begins the suspend-audio-transmission period. Calculation of the duration is based on the size of buffer 210, the playback rate at sink device 104, the rate at which the packets are transmitted, and the value of the channel quality indicator that represents the channel conditions. An example calculation performed by scheduler 260 follows:

$$\text{Suspend-Audio-Transmission Period Duration} = N_{MAX}/R_{PB} - \beta/R_{TX} \quad (1)$$

where $N_{MAX}$ is the maximum number of audio samples that can be stored in buffer 210 and is therefore a measure of the size of buffer 210, $R_{PB}$ is the playback rate at sink device 104 measured in samples per time-unit, β is the channel quality indicator measured in samples that represents the channel conditions, and $R_{TX}$ is the transmission rate for audio samples from source device 102 to sink device 104, measured in samples per time-unit.

It will be appreciated by persons of ordinary skill in the art that the playback rate $R_{PB}$ is lower than the transmission rate $R_{TX}$. Indeed, the A2DP specification further states at section 2.3 "User Requirements and Scenarios" page 12 "The audio data rate should be sufficiently smaller than usable bit rate on the Bluetooth link. This is to allow retransmission schemes to reduce the effects of packet loss." For example, $R_{PB}$ may be in the range of 320 kbps, multiplied by the audio sample size in kilobits. Example values for $R_{TX}$ may be approximately 250 kbps and 345 kbps, multiplied by the audio sample size in kilobits. Consequently, source device 102 does not need to transmit audio samples continuously to sink device 104 in order for sink device 104 to be able to play back the audio samples without interruption.

No audio samples are transmitted by source device 102 to sink device 104 during the suspend-audio-transmission period. Playback of audio samples from a full buffer 210 at the playback rate without replenishment will result in an empty buffer after $N_{MAX}/R_{PB}$. $\beta/R_{TX}$ is an estimate of the amount of time for a packet comprising a single audio sample to be transmitted from source device 102 and received by sink device 104, given channel conditions as represented by the channel quality indicator β. Therefore, the example duration calculation given above provides just-in-time scheduling of audio streaming by BT module 252, so that buffer 210 is almost empty when a next scheduled transmission of audio by BT module 252 begins. However, this method may be modified to calculate a shorter suspend-audio-transmission period so that scheduling of audio streaming by BT module 252 is not just-in-time and buffer 210 is not almost empty but rather has reached a particular capacity, for example, a "low watermark", when a next scheduled transmission of audio by BT module 252 begins.

Once the suspend-audio-transmission period has ended, as checked by scheduler 260 at 316, the method resumes at 306 with scheduler 260 instructing BT module 252 to transmit a packet comprising an audio sample over the wireless medium.

It is possible that BT module 252 may place one or more portions of BT module 252, for example, a radio frequency portion, into a low-power state during part or all of the suspend-audio-transmission period.

The example method illustrated in FIG. 3 may be represented by the following pseudo-code:

```
while (A2DP_AckFlow == GO)
    TX_A2DP_sample;
Duration = N_MAX/R_PB - β/R_TX
``` where $N_{MAX}$, $R_{PB}$, $R_{TX}$, and β are as defined above, Duration is the duration of the suspend-audio-transmission period, A2DP_AckFlow==GO represents the condition that the Flow field of the acknowledgement for A2DP traffic has the value GO and therefore buffer 210 is not full, and TX_A2 DP_sample represents transmission of a single A2DP audio sample.

Returning now to FIG. 2, source device 102 may optionally comprise a WLAN module 262 that is operative in the same radio frequency band as BT module 252 and BT module 202, namely the ISM 2.4 GHz band. In the situation where source device 102 comprises WLAN module 262, scheduler 260 arbitrates between collocated BT module 252 and WLAN module 262 to determine which of the two modules is permitted access to the wireless medium at any given time. Scheduler 260 does not permit access to the wireless medium at the same time by both modules, in order to reduce the occurrence of collisions.

In some implementations, scheduler 260 and WLAN module 262 are on the same integrated circuit and BT module 252 is on a different integrated circuit. In such implementations, scheduler 260 has extensive access to WLAN module 262 and its operation and limited access to BT module 252 and its operation.

In other implementations, scheduler 260, WLAN module 262, and BT module 252 are on the same integrated circuit. In such implementations, scheduler 260 has extensive access to WLAN module 262 and its operation and extensive access to BT module 252 and its operation. For example, a proprietary message exchange between BT module 252 and scheduler 260 may provide scheduler 260 with the Flow field of the most recently received acknowledgement from the sink device.

In yet other implementations, WLAN module 262 and BT module 252 are on different integrated circuits, and scheduler 260 is implemented such that it has limited access to WLAN module 262 and its operation and limited access to BT module 252 and its operation.

Figure 4:
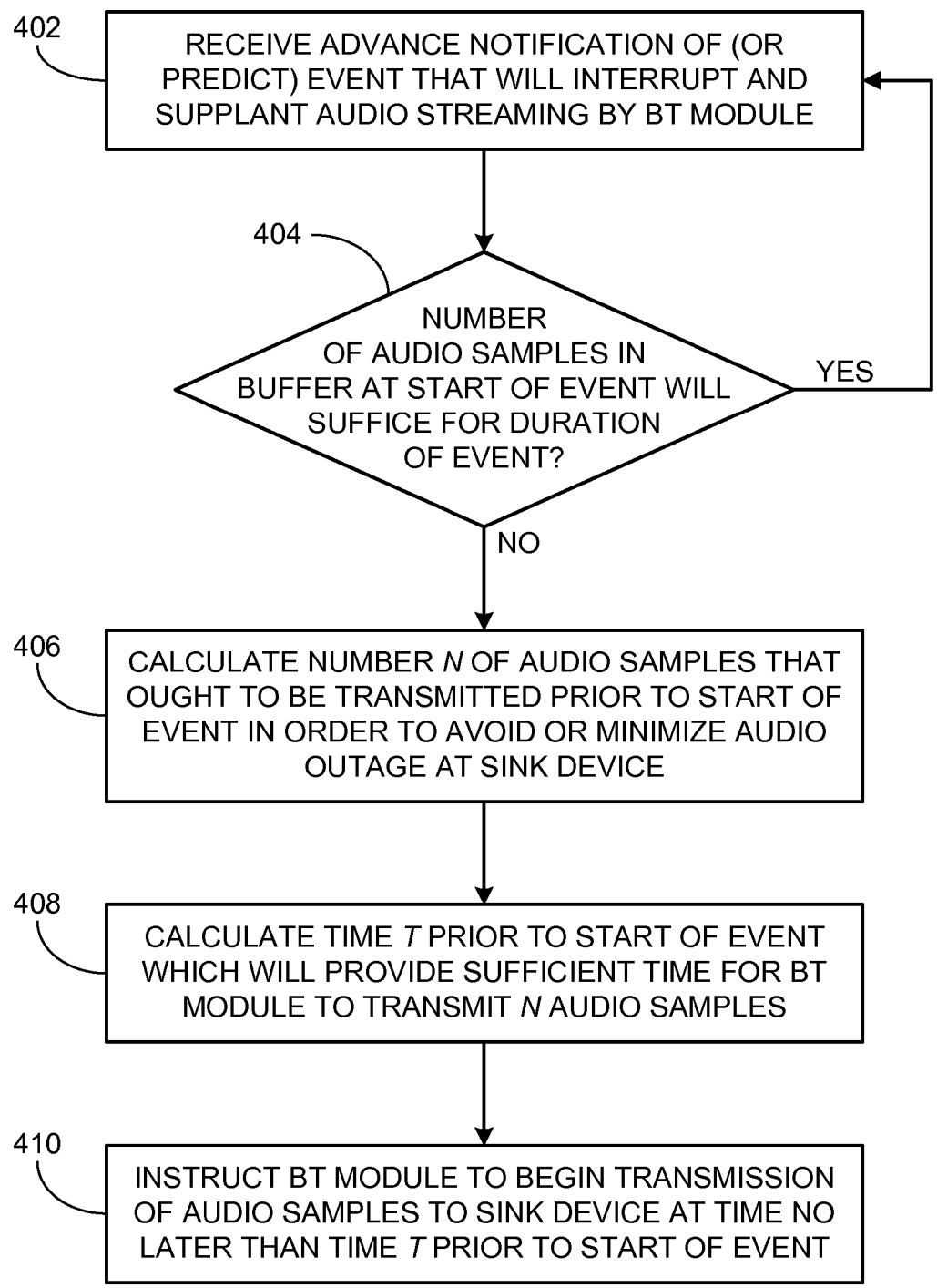
FIG. 4 illustrates another example method for determining when the source device should transmit audio samples to the sink device.

FIG. 4 illustrates another example method to be implemented by scheduler 260 to determine when BT module 252 should transmit audio samples to sink device 104. FIGS. 5-1, 5-2 and 5-3 are example timelines helpful in understanding the example method illustrated in FIG. 4.

Figures 1, 5:
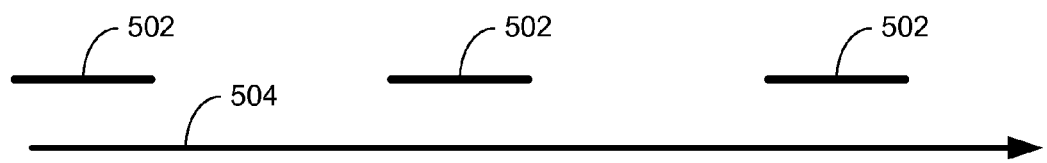
Figures 2, 5:
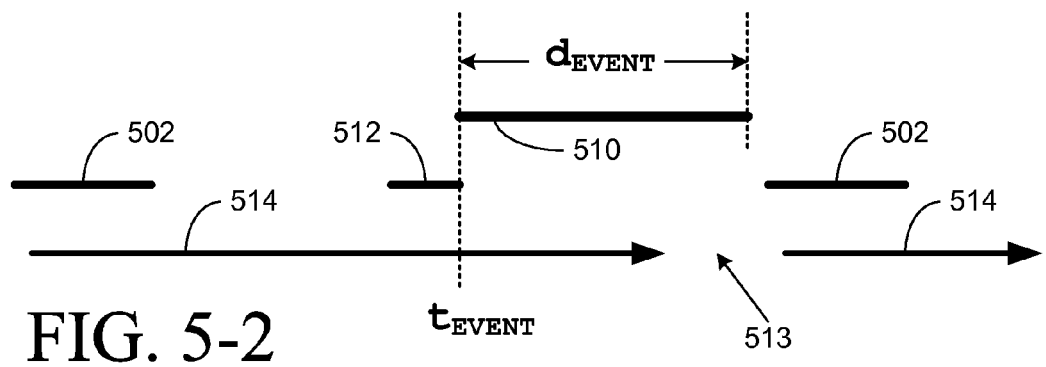
Figures 3, 5:
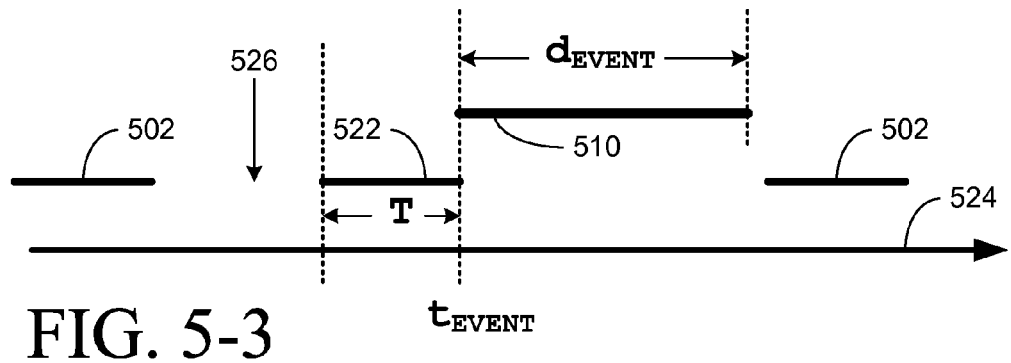

In the example timeline illustrated in FIG. 5-1, regular brief periods 502 of transmission of packets comprising audio samples by BT module 252 are sufficient to enable continuous, uninterrupted playback 504 of audio at sink device 104. Scheduler 260 may instruct BT module 252 to transmit audio samples to sink device 104 for these regular brief periods. Other activity may occur on the wireless medium when BT module 252 is not transmitting audio samples. Examples of such other activity include transmission of other BT traffic by BT module 252, reception of other BT traffic by BT module 252, transmission of WLAN traffic by WLAN module 262, and reception of WLAN traffic by WLAN module 262. Scheduler 260 may implement just-in-time scheduling of audio streaming by BT module 252, so that buffer 210 is almost empty when a next scheduled transmission of audio samples by BT module 252 begins.

In the example timeline illustrated in FIG. 5-2, an event 510 starting at the time $t_{EVENT}$ and lasting duration $d_{EVENT}$ requires access to the wireless medium, and scheduler 260 permits the event to interrupt and supplant a scheduled transmission 512 of audio samples by BT module 252. Because the scheduled transmission 512 of audio samples by BT module 252 has been interrupted and supplanted, in this example sink device 104 runs out of audio samples to play back before transmission of audio samples by BT module 252 resumes, and therefore a gap 513 in the playback 514 of audio ("audio outage") at sink device 104 occurs.

Returning now to FIG. 4, the example method is applicable to the situation where scheduler 260 has scheduled transmission of audio by BT module 252 and is able to predict or be notified in advance of an event that will interrupt and supplant the scheduled transmission. Such an event may be, for example, transmission of high priority BT traffic over a SCO channel by BT module 252, reception of high priority BT traffic over a SCO channel by BT module 252, transmission of WLAN traffic by WLAN module 262, a WLAN roaming event, or reception of a voice call.

At 402, scheduler 260 receives advance notification of or predicts an event that will interrupt and supplant audio streaming by BT module 252. The advance notification or prediction is of a start time $t_{EVENT}$ of the event and of a duration $d_{EVENT}$ of the event. No audio samples will be transmitted by BT module 252 from start time $t_{EVENT}$ for a period of time lasting duration $d_{EVENT}$, because the event supplants the transmission of audio samples by BT module 252.

At 404, scheduler 260 determines whether the number of audio samples that will be in buffer 210 at the start time, denoted $N(t_{EVENT})$, will suffice for the duration of the event. Mathematically this is expressed as follows:

$$N(t_{EVENT})/R_{PB} > d_{EVENT}? \qquad (2)$$

Because $t_{EVENT}$ is a future time, the calculation of $N(t_{EVENT})$ is based on the number of audio samples in buffer 210 at the current time, the playback rate $R_{PB}$ and the transmission rate $R_{TX}$.

If scheduler 260 determines there will be a sufficient number of audio samples in buffer 210 at the start time to outlast the event, the method returns to 402 for the advance notification or prediction of the next event that will interrupt and supplant audio transmission by BT module 252.

If scheduler 260 determines there will not be a sufficient number of audio samples in buffer 210 at the start time to outlast the event, scheduler 260 proceeds to calculate at 406 a number of audio samples that ought to be transmitted prior to the start time in order to avoid or minimize audio outage at sink device 104. For example, this calculation may be performed as follows:

$$\text{Deficit(in samples)} = R_{PB} * [d_{EVENT} - N(t_{EVENT})/R_{PB}] \qquad (3)$$

$$N_1 = \min(N_{MAX}, N(t_{EVENT}) + \text{Deficit}) \qquad (4)$$

$$N_2 = N_1 - N(t_{EVENT}) \qquad (5)$$

$N(t_{EVENT})/R_{PB}$ represents the amount of time to play back the contents of buffer 210, starting at start time $t_{EVENT}$. $[d_{EVENT} - N(t_{EVENT})/R_{PB}]$ represents by how much time the duration of the event will exceed the amount of time to play back the contents of buffer 210, starting at $t_{EVENT} * R_{RB} * [d_{EVENT} - N(t_{EVENT})/R_{PB}]$ therefore represents the deficit in samples.

If, at the start time, buffer 210 contained the following number of audio samples: $N(t_{EVENT}) + \text{Deficit}$, then no audio outage would occur. However, buffer 210 cannot contain more than $N_{MAX}$ audio samples at any time. If $N(t_{EVENT}) + \text{Deficit}$ does not exceed $N_{MAX}$, $N_1$ is precisely the number of audio samples needed in buffer 210 at $t_{EVENT}$ in order to avoid an audio outage due to the event. If $N(t_{EVENT}) + \text{Deficit}$ exceeds $N_{MAX}$, an audio outage is unavoidable, and $N_1$ is the number of audio samples needed in buffer 210 at $t_{EVENT}$ in order to minimize the duration of the audio outage due to the event.

Therefore, $N_2$ is the number of additional audio samples to be transmitted to sink device 104 prior to the start of the event in order to avoid or minimize the audio outage due to the event.

At 408, scheduler 260 calculates a time T prior to the start of the event which will provide sufficient time for BT module 252 to transmit $N_2$ samples to sink device 104. For example, T is calculated as follows:

$$T = t_{EVENT} - R_{TX} * N_2 \qquad (6)$$

At 410, scheduler 260 instructs BT module 252 to begin transmission of audio samples to sink device 104 at a time no later than $t_{EVENT} - T$.

In the example timeline illustrated in FIG. 5-3, transmission 522 of audio samples by BT module 252 starting at time $t_{EVENT} - T$ is sufficient to avoid an audio outage in playback 524 at sink device 104.

It is possible that BT module 252 may place one or more portions of BT module 252, for example, a radio frequency portion, into a low-power state during a period of time 526 that ends before $t_{EVENT} - T$.

Figure 6:
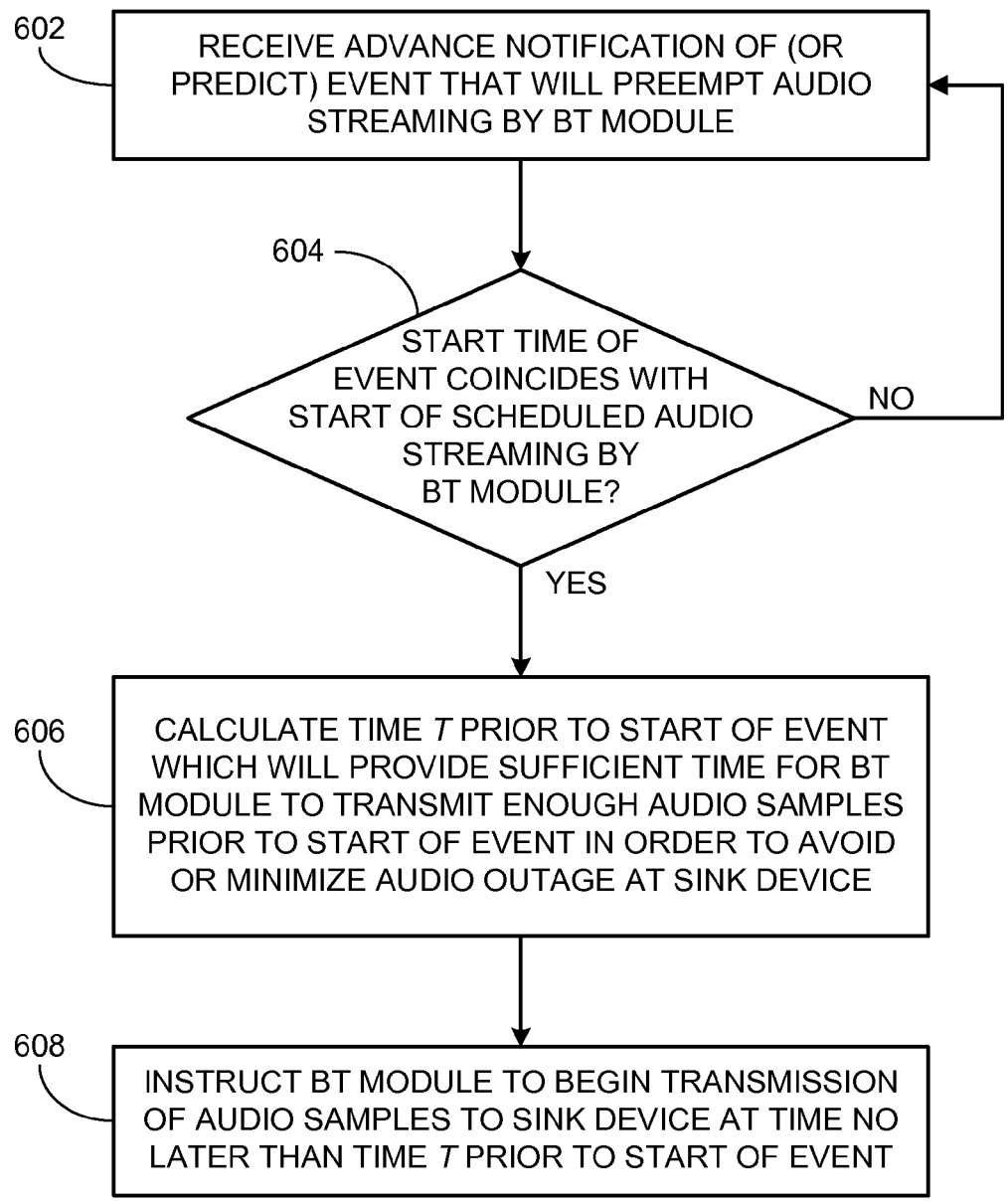
FIG. 6 illustrates another example method for determining when the source device should transmit audio samples to the sink device.

FIG. 6 illustrates another example method to be implemented by scheduler 260 to determine when BT module 252 should transmit audio samples to sink device 104. FIGS. 7-1, 7-2 and 7-3 are example timelines helpful in understanding the example method illustrated in FIG. 6.

Figures 1, 7:
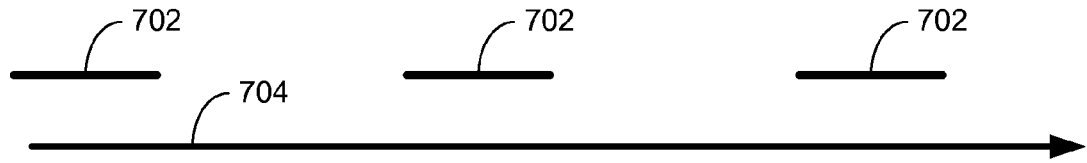
Figures 2, 7:
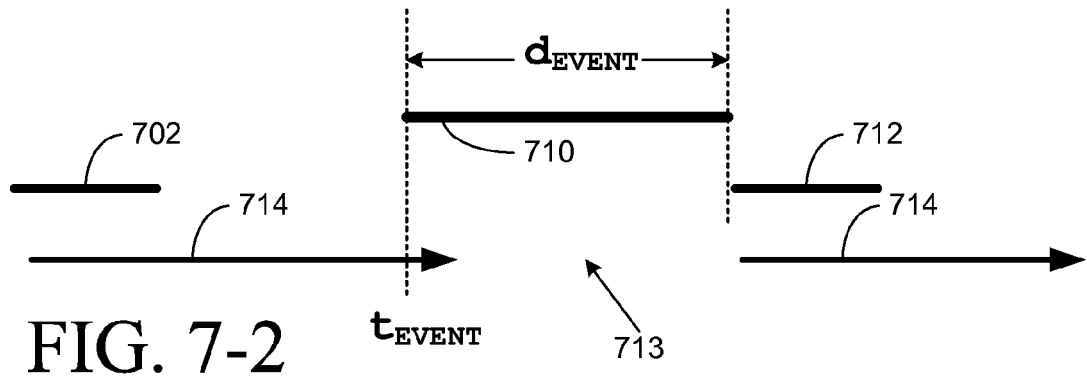
Figures 3, 7:
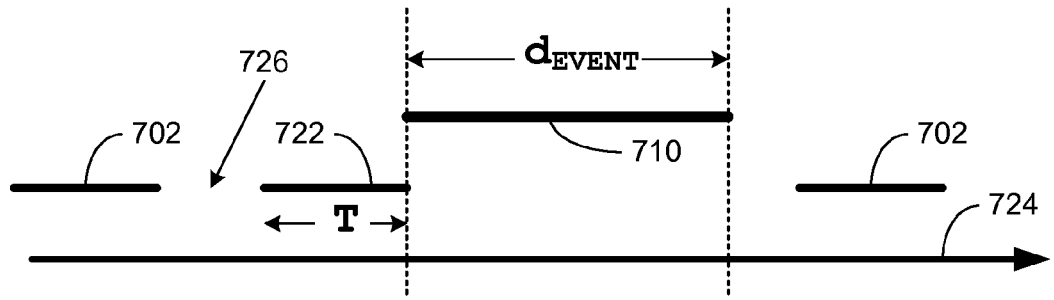

In the example timeline illustrated in FIG. 7-1, regular brief periods 702 of transmission of packets comprising audio samples by BT module 252 are sufficient to enable continuous, uninterrupted playback 704 of audio at sink device 104. Scheduler 260 may instruct BT module 252 to transmit audio samples to sink device 104 for these regular brief periods. Other activity may occur on the wireless medium when BT module 252 is not transmitting audio samples. Examples of such other activity include transmission of other BT traffic by BT module 252, reception of other BT traffic by BT module 252, transmission of WLAN traffic by WLAN module 262, and reception of WLAN traffic by WLAN module 262. Scheduler 260 may implement just-in-time scheduling of audio streaming by BT module 252, so that buffer 210 is almost empty when a next scheduled transmission of audio samples by BT module 252 begins.

In the example timeline illustrated in FIG. 7-2, an event 710 starting at the time $t_{EVENT}$ and lasting duration $d_{EVENT}$ requires access to the wireless medium, and scheduler 260 permits the event to preempt a scheduled transmission of audio samples by BT module 252. Such an event may be, for example, transmission of high priority BT traffic over a SCO channel by BT module 252, reception of high priority BT traffic over a SCO channel by BT module 252, transmission of WLAN traffic by WLAN module 262, a WLAN roaming event, or reception of a voice call. Because the scheduled transmission of audio samples by BT module 252 has been preempted, in this example sink device 104 quickly runs out of audio samples during the event, and therefore a gap 713 in the playback 714 of audio ("audio outage") at sink device 104 occurs. In this example, scheduler 260 schedules transmission 712 of audio samples by BT module 252 immediately following the event, so that audio playback can resume as soon as possible.

Returning now to FIG. 6, the example method is applicable to the situation where scheduler 260 has scheduled transmission of audio by BT module 252 and is able to predict or be notified in advance of an event that will preempt the scheduled transmission. In other words, scheduler 260 will not permit BT module 252 to begin its scheduled transmission of audio samples.

At 602, scheduler 260 receives advance notification of or predicts an event that will preempt audio streaming by BT module 252. The advance notification or prediction is of a start time $t_{EVENT}$ of the event and of a duration $d_{EVENT}$ of the event. No audio samples will be transmitted by BT module 252 from start time $t_{EVENT}$ for a period of time lasting duration $d_{EVENT}$, because the event preempts the transmission of audio samples by BT module 252.

If scheduler 260 implements just-in-time scheduling of audio streaming by BT module 252, buffer 210 is almost empty when a next scheduled transmission of audio samples by BT module 252 begins.

In the situation where the start time $t_{EVENT}$ coincides with the start of a next scheduled transmission of audio by BT module 252, scheduler 260 proceeds to calculate at 606 a time T prior to the start of the event at which transmission of audio by BT module ought start in order to avoid or minimize audio outage at sink device 104. For example, this calculation may be performed as follows:

$$T+d_{EVENT} < T*R_{TX}/R_{PB} \quad (8)$$

$$T > d_{EVENT}/(R_{TX}/R_{PB}-1) \quad (9)$$

$T*R_{TX}/R_{PB}$ represents the amount of time to play back the contents of buffer 210, if the contents consist of samples transmitted at rate $R_{TX}$ during a period of duration T that ends at the start time $t_{EVENT}$.

$T+d_{EVENT} < T*R_{TX}/R_{PB}$ represents the condition that no audio outage will occur at sink device 104 during playback due to the event, because the amount of time to play back the contents of buffer 210, counted from $t_{EVENT}-T$, exceeds the time that will pass from $t_{EVENT}-T$ to the end of the event, represented by $T+d_{EVENT}$. By isolating T in equation 8, one arrives at equation 9.

At 608, scheduler 260 instructs BT module 252 to begin transmission of audio samples to sink device 104 at a time no later than $t_{EVENT}-T$.

In the example timeline illustrated in FIG. 7-3, transmission 722 of audio samples by BT module 252 starting at time $t_{EVENT}-T$ is sufficient to avoid an audio outage in playback 724 at sink device 104.

It is possible that BT module 252 may place one or more portions of BT module 252, for example, a radio frequency portion, into a low-power state during a period of time 726 that ends before $t_{EVENT}-T$.

As noted above, $N_{MAX}$ is the maximum number of audio samples that can be stored in buffer 210 and is therefore a measure of the size, that is, of the maximum capacity, of buffer 210. Source device 102 determines the size of buffer 210, even though the A2DP Specification V12 does not include any provisions for source device 102 to determine the size of buffer 210.

Figure 8:
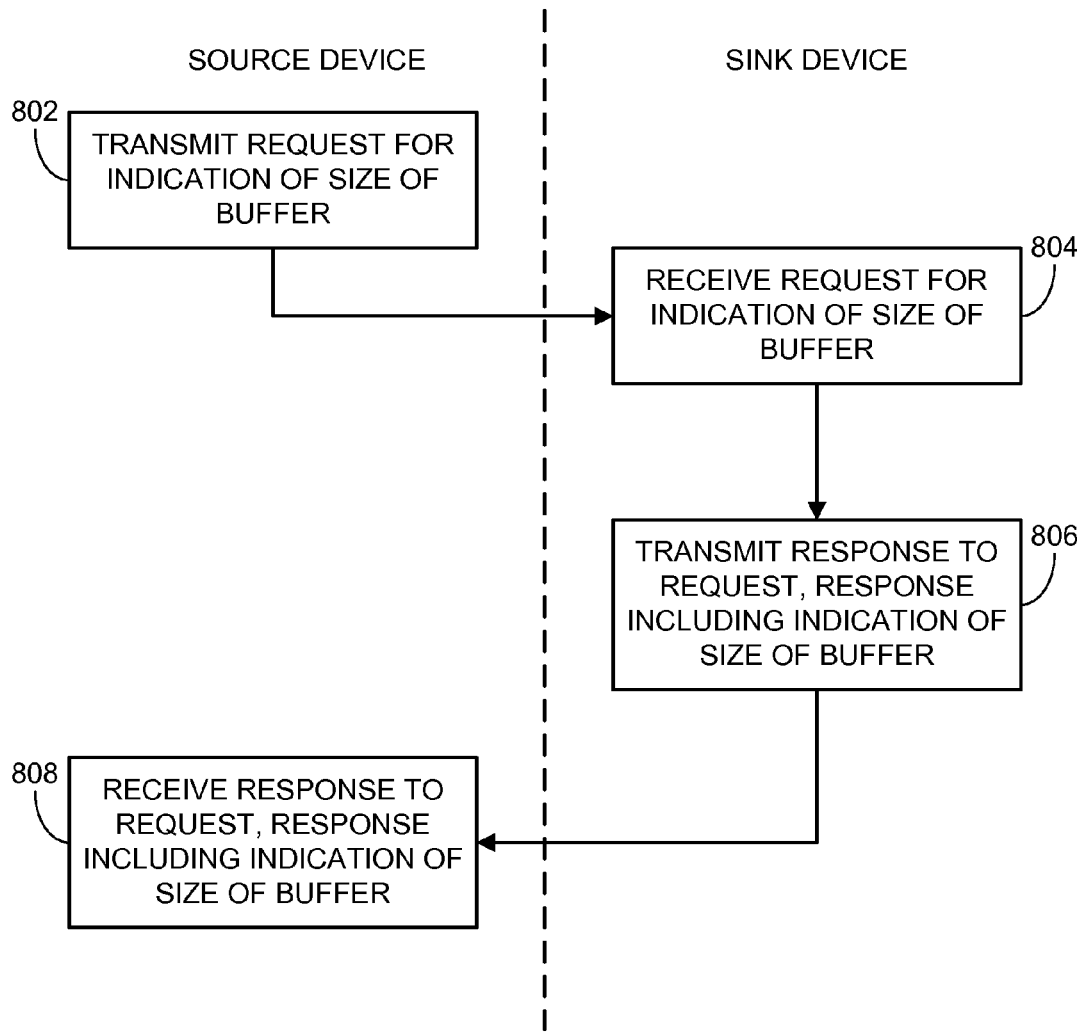
FIG. 8 illustrates an example method to be implemented by the source device and the sink device to determine the size of the sink device's buffer that receives audio samples.

FIG. 8 illustrates an example method to be implemented by source device 102 and sink device 104 to determine the size of buffer 210. At 802, source device 102 transmits a request to sink device 104 for an indication of a size of buffer 210. The request is transmitted over an ACL channel on the wireless medium, namely the same ACL channel over which the audio is to be transmitted. For example, source device 102 may transmit to sink device 104 an Audio Video Distribution Transport Protocol (AVDTP) Get_Capabilities command signal including a buffer_size field. At 804, sink device 104 receives the request from source device 102. At 806, sink device 104 transmits to source device 102 a response to the request. The response includes an indication of the size of buffer 210. For example, sink device 104 may transmit to source device 102 a buffer_size_response message indicating the size of buffer 210. The example provided herein requires that the AVDTP Get_Capabilities command signal include a new buffer_size field and that the size of buffer 210 be made available to the AVDTP component in BT module 202 at sink device 104.

Figure 9:
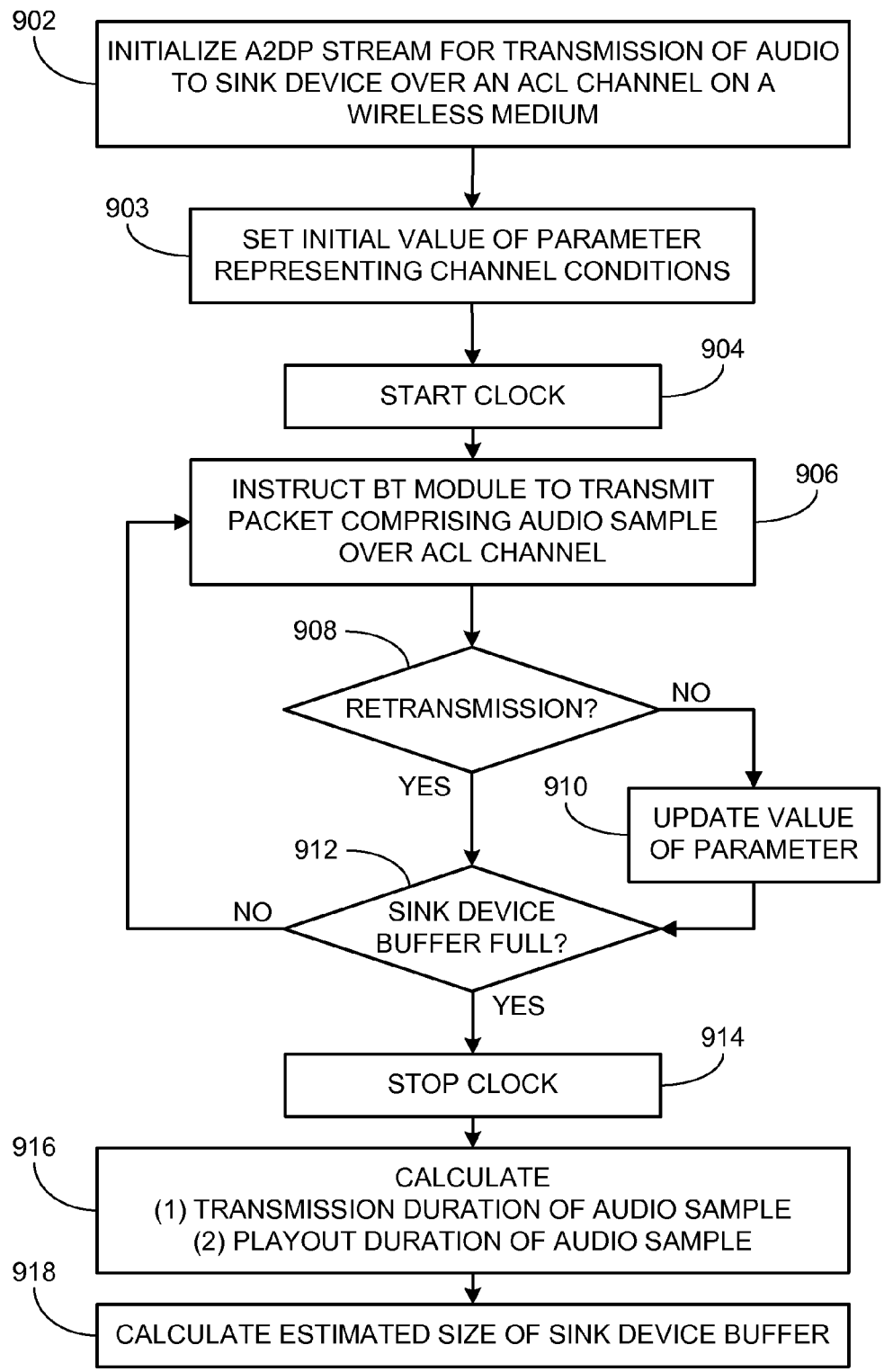
FIG. 9 illustrates another example method to be implemented by the source device and the sink device to determine the size of the sink device's buffer that receives audio samples.

FIG. 9 illustrates another example method to be implemented by source device 102 and sink device 104 to determine the size of buffer 210. At 902, source device 102 initializes an A2DP stream for transmission of audio to sink device 104 over an ACL channel on a wireless medium. At 903, source device 102 sets an initial value of a channel quality indicator that represents conditions of the ACL channel over which the audio samples are being transmitted. For example, a channel quality indicator β may be set to the value 1. Source device 102 starts a clock at 904 and begins transmission of the audio to sink device 104 at 906 by instructing BT module 252 to transmit a packet comprising an audio sample over the ACL channel.

At 908, source device 102 checks whether the transmission for which the instruction was given at 906 is a retransmission. Retransmission of a packet will occur if a most recent transmission of the packet was unacknowledged by the intended recipient. An indication whether the transmission is a retransmission or not will be available to source device 102 from the best-effort recovery mechanism, for example, from an ACL component of BT module 252. If the transmission for which the instruction was given at 906 is a retransmission, then at 910, source device 102 updates the value of the channel quality indicator that represents the channel conditions. For example, channel quality indicator β may be incremented by 1. The worse the channel conditions, the more retransmissions will occur.

As an A2DP packet comprising the audio sample travels down the Bluetooth stack in BT module 252, the A2DP packet may be fragmented over multiple ACL packets. The ACL packets are sent sequentially over an ACL channel to sink device 104, where they are acknowledged by the baseband component of BT module 202. The acknowledgement generated by the baseband component of BT module 202 contains a Flow field able to take on the values GO or STOP. As long as buffer 210 is not full, the Flow field of the acknowledgement will have the value GO. When buffer 210 is full, the Flow field of the acknowledgement will have the value STOP.

By inspecting the Flow field of the most recently received acknowledgement received from sink device 104, source device 102 determines at 908 whether buffer 210 is full or not full. If buffer 210 is not full, then source device 102 instructs BT module 252 to transmit a packet comprising an audio sample over the ACL channel at 906.

If buffer 210 is full, then source device 102 stops a clock at 914 and calculates at 916 the average time to transmit a single A2DP audio sample from source device 102 to sink device 104 and the average time to playback a single A2DP audio at sink device 104. At 918, source device 102 then calculates an estimated size of buffer 210 from the average times calculated at 916.

The example method illustrated in FIG. 9 may be represented by the following pseudo-code:

```
initialize A2DP stream;
start_time = clock( );
while (A2DP_AckFlow == GO)
    TX_A2DP_sample;
end_time = clock( );
A2DP_Sample_TX_Time = A2DP_sample_size/R_TX
A2DP_Sample_PB_Time = A2DP_sample_size/R_PB
Estimated_Buffer_Size =
    ([end_time-start_time]/A2DP_Sample_TX_time) –
β – ([end_time-start_time]/A2DP_Sample_PB_time)
``` where $R_{PB}$, and $R_{TX}$ are as defined above, A2DP AckFlow==GO represents the condition that the Flow field of the acknowledgement for A2DP traffic has the value GO and therefore buffer 210 is not full, TX_A2DP_sample represents transmission of a single A2DP audio sample, A2DP_Sample_TX_Time represents the average time to transmit a single A2DP audio sample from source device 102 to sink device 104, A2 DP_Sample_PB_Time represents the average time to playback a single A2DP audio sample at sink device 104, A2DP_sample_size represents the size of a single A2DP audio sample, and Estimated_Buffer_Size represents an estimate of the number of A2DP samples in buffer 210 when buffer 210 is full. Effectively, the example method illustrated in FIG. 9 calculates the total number of transmitted A2DP audio samples less the number of retries to find the actual number of transmitted A2DP audio samples that were received by sink device 104, and then subtracts from the actual number of transmitted A2DP audio samples that were received by sink device 104 the number of A2DP audio samples that were played back at sink device 104, thus arriving at the maximum number of A2DP audio samples stored in buffer 210 before the Flow field in the acknowledgement switches from the value GO to the value STOP.

As noted above, source device 102 may monitor a number of audio samples transmitted to sink device 104. Source device 102 may be able to determine at any given time the number of audio samples remaining in buffer 210 by performing a calculation based on the size of buffer 210, the number of audio samples transmitted (discounting any retransmissions), and the playback rate.

If scheduler 260 is implemented in BT module 252, as may be the case where source device 102 does not comprise another module operative in the same radio frequency band as BT module 252, scheduler 260 has access to the precise number of audio samples transmitted to sink device 104 and has access to the Flow field of the most recently received acknowledgment from sink device 104.

If scheduler 260 is on the same integrated circuit as BT module 252, scheduler 260 may have extensive access to BT module 252 and its operation, including access to the precise number of audio samples transmitted to sink device 104 and access to the Flow field of the most recently received acknowledgment from sink device 104.

If scheduler 260 is on a different integrated circuit than BT module 252, as may be the case where scheduler 260 and WLAN module 262 are on the same integrated circuit and BT module 252 is on a different integrated circuit, scheduler 260 may have limited access to BT module 252 and its operation.

Figure 10:
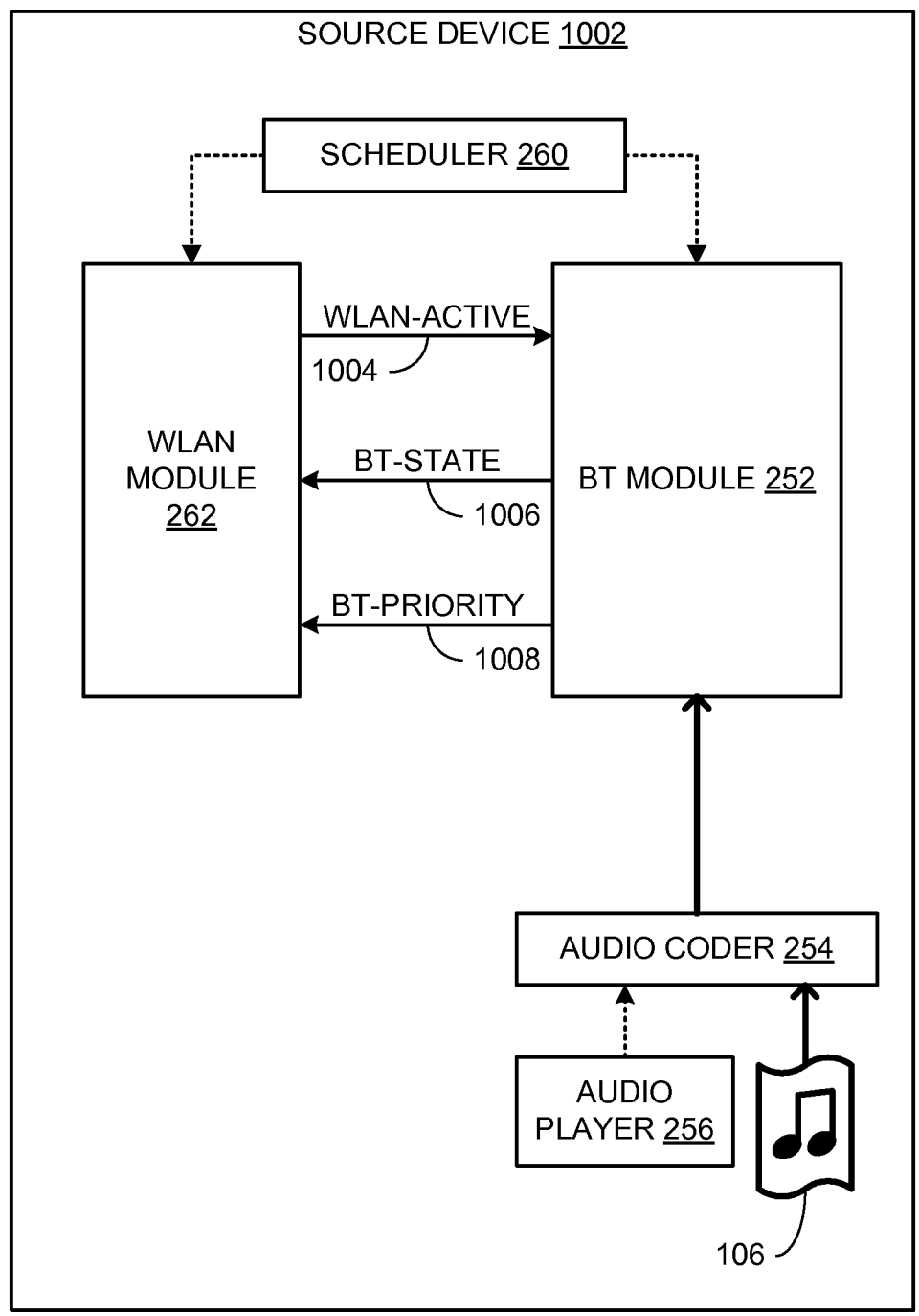
FIG. 10 illustrates example functional aspects of an example source device, where the scheduler has limited access to a module that sends audio samples to the sink device.

FIG. 10 illustrates an example source device 1002, which is an example of source device 102 in the case where WLAN module 262 is not optional and scheduler 260 has limited access to BT module 252 and its operation. In the example illustrated in FIG. 10, scheduler 260 and WLAN module 262 are on an integrated circuit 1004, and three wires are used to communicate between integrated circuit 1004 and BT module 252. A WLAN-ACTIVE wire 1004 from integrated circuit 1004 to BT module 252 indicates by its state to BT module 252 whether BT module 252 is permitted to transmit over the wireless medium or is not permitted to transmit over the wireless medium. BT module 252 activates a BT-STATE wire 1006 from BT module 252 to integrated circuit 1004 during transmission and reception of BT traffic by BT module 252. Scheduler 260 may use the state of BT-STATE wire 1006 to determine a level of activity performed by BT module 252. BT module 252 activates a BT-PRIORITY wire 1008 from BT module 252 to integrated circuit 1004 to assert the presence of high priority BT packets. Scheduler 260 may use the state of BT-PRIORITY wire 1008 in determining when to allocate access to the wireless medium to BT module 252.

Additionally, scheduler 260 may use patterns of transmission and reception by BT module 252 to infer the type of BT traffic currently being exchanged, thus identifying whether A2DP traffic is present. This information may be used to assist scheduler 260 in monitoring a number of audio samples transmitted to sink device 104.

Additionally, BT module 252 may use unique toggling sequences on BT-PRIORITY wire 1008 to indicate whether the Flow field in the most recent acknowledgment received from sink device 104 has the value GO or the value STOP.

The methods and mechanisms described above are applicable also to the situation where the source device is a Peer-to-Peer (P2P) Concurrent Device that can operate concurrently as a P2P device and with a WLAN infrastructure network. The P2P Concurrent device has dual MAC functionality, which may be provided via two separate physical MAC entities each associated with its own PHY entity, two virtual MAC entities over one PHY entity, or any other approach.

One MAC entity operates as a station in the WLAN infrastructure network, and the second MAC entity operates as the P2P device. The scheduler and the dual MAC functionality are all on the same integrated circuit, and therefore the scheduler has full access to the operation of the station in the WLAN infrastructure network and full access to the operation of the P2P device.

What is claimed is:

1. A method in a first device having a first communication interface compatible with a first communication protocol for communications over a wireless medium and a second communication interface compatible with a second communication protocol for communications over the wireless medium, the method comprising:
establishing a communication session over the wireless medium with an external device compatible with the first communication protocol;
determining a maximum capacity of a buffer at the external device for receipt of audio samples to be transmitted in packets from the first device to the external device in an asynchronous connectionless link over the wireless medium;
determining a playout rate at the external device of the audio samples from the buffer;
determining that a future event at the first device will preempt or supplant transmission of the audio samples from the first device to the external device;
determining a forecasted deficit in audio samples for playout at the buffer due to the future event; and
scheduling access by the first communication interface to the wireless medium in advance of the future event for transmission of audio samples in packets from the first device to the external device to reduce the forecasted deficit.

2. The method as recited in claim 1, wherein the future event at the first device involves the second communication interface.

3. The method as recited in claim 1, wherein the future event at the first device involves high priority traffic at the first communication interface.

4. The method as recited in claim 1, wherein the second communication protocol comprises a wireless local area network protocol.

5. The method as recited in claim 1, wherein the first communication protocol comprises an adaptive frequency hopping spread spectrum wireless personal area network protocol.

6. The method as recited in claim 5, wherein determining the maximum capacity of the buffer comprises:
transmitting, via the first communication interface to the external device, a request for an indication of the maximum capacity of the buffer; and
in response to transmitting the request, receiving from the external device via the first communication interface the indication of the maximum capacity of the buffer.

7. The method as recited in claim 6, wherein transmitting the request comprises transmitting an Audio Video Distribution Transport Protocol (AVDTP) Get_Capabilities command signal including a buffer_size field and receiving the indication comprises receiving a buffer_size_response message indicating the maximum capacity of the buffer.

8. The method as recited in claim 1, wherein determining the maximum capacity of the buffer comprises:
transmitting, via the first communication interface to the external device, a request for an indication of the maximum capacity of the buffer; and
in response to transmitting the request, receiving from the external device via the first communication interface the indication of the maximum capacity of the buffer.

9. The method as recited in claim 1, wherein determining the maximum capacity of the buffer comprises:
transmitting audio samples in packets from the first device to the external device in the asynchronous connectionless link over the wireless medium until the external device signals to the first device that the buffer is full;
calculating an average time to transmit a single audio sample from the first device to the external device;
calculating an average time to playback a single audio sample at the external device; and
calculating an estimated maximum capacity of the buffer from the average time to transmit and the average time to playback.

10. A first device comprising:
a first communication interface, the first communication interface compatible with a first communication protocol for communications over a wireless medium;
a second communication interface, the second communication interface compatible with a second communication protocol for communications over the wireless medium;
an audio coder coupled to the first communication interface; and
a scheduler coupled to the first communication interface,
wherein the first device is operable to establish via the first communication interface a communication session over the wireless medium with an external device compatible with the first communication protocol,
wherein the first device is operable to determine a maximum capacity of a buffer at the external device for receipt of audio samples to be transmitted in packets from the first device to the external device in an asynchronous connectionless link over the wireless medium,
wherein the scheduler is to take the maximum capacity of the buffer into account in scheduling access by the first communication interface to the wireless medium for transmission of the audio samples, and
wherein the first device is operable to determine the maximum capacity of the buffer by:
transmitting audio samples in packets from the first device to the external device in the asynchronous connectionless link over the wireless medium until the external device signals to the first device that the buffer is full;
calculating an average time to transmit a single audio sample from the first device to the external device;
calculating an average time to playback a single audio sample at the external device; and
calculating an estimated maximum capacity of the buffer from the average time to transmit and the average time to playback.

11. A first device comprising:
a first communication interface, the first communication interface compatible with a first communication protocol for communications over a wireless medium;
a second communication interface, the second communication interface compatible with a second communication protocol for communications over the wireless medium;
an audio coder coupled to the first communication interface; and
a scheduler coupled to the first communication interface, wherein the first device is operable:

to establish via the first communication interface a communication session over the wireless medium with an external device compatible with the first communication protocol;

to determine a maximum capacity of a buffer at the external device for receipt of audio samples to be transmitted in packets from the first device to the external device in an asynchronous connectionless link over the wireless medium;

to determine a playout rate at the external device of the audio samples from the buffer;

to determine that a future event at the first device will preempt or supplant transmission of the audio samples from the first device to the external device;

to determine a forecasted deficit in audio samples for playout at the buffer due to the future event; and to schedule access by the first communication interface to the wireless medium in advance of the future event for transmission of audio samples in packets from the first device to the external device to reduce the forecasted deficit.

12. The first device as recited in claim 11, wherein the future event at the first device involves the second communication interface.

13. The first device as recited in claim 11, wherein the future event at the first device involves high priority traffic at the first communication interface.

14. The first device as recited in claim 11, wherein the second communication protocol comprises a wireless local area network protocol.

15. The first device as recited in claim 11, wherein the first communication protocol comprises an adaptive frequency hopping spread spectrum wireless personal area network protocol.

16. The first device as recited in claim 15, wherein the first device is operable to determine the maximum capacity of the buffer by:

transmitting, via the first communication interface to the external device, a request for an indication of the maximum capacity of the buffer; and in response to transmitting the request, receiving from the external device via the first communication interface the indication of the maximum capacity of the buffer.

17. The first device as recited in claim 16, wherein the first communication protocol comprises an adaptive frequency hopping spread spectrum wireless personal area network protocol and wherein transmitting the request comprises transmitting an Audio Video Distribution Transport Protocol (AVDTP) Get_Capabilities command signal including a buffer_size field and receiving the indication comprises receiving a buffer_size_response message indicating the maximum capacity of the buffer.

18. The first device as recited in claim 11, wherein the first device is operable to determine the maximum capacity of the buffer by:

transmitting, via the first communication interface to the external device, a request for an indication of the maximum capacity of the buffer; and in response to transmitting the request, receiving from the external device via the first communication interface the indication of the maximum capacity of the buffer.

19. The first device as recited in claim 11, wherein the first device is operable to determine the maximum capacity of the buffer by:

transmitting audio samples in packets from the first device to the external device in the asynchronous connectionless link over the wireless medium until the external device signals to the first device that the buffer is full;

calculating an average time to transmit a single audio sample from the first device to the external device;

calculating an average time to playback a single audio sample at the external device; and calculating an estimated maximum capacity of the buffer from the average time to transmit and the average time to playback.

* * * * *